United States Patent
Tasch

(10) Patent No.: US 11,666,884 B2
(45) Date of Patent: Jun. 6, 2023

(54) MATERIAL FOR STORING AND RELEASING OXYGEN

(71) Applicant: Alexander Tasch, Küllstedt (DE)

(72) Inventor: Alexander Tasch, Küllstedt (DE)

( * ) Notice: Subject to any disclaimer, the term of this patent is extended or adjusted under 35 U.S.C. 154(b) by 680 days.

(21) Appl. No.: 16/605,981

(22) PCT Filed: Apr. 27, 2018

(86) PCT No.: PCT/EP2018/060958
§ 371 (c)(1),
(2) Date: Oct. 17, 2019

(87) PCT Pub. No.: WO2018/197703
PCT Pub. Date: Nov. 1, 2018

(65) Prior Publication Data
US 2020/0038833 A1 Feb. 6, 2020

(30) Foreign Application Priority Data

Apr. 28, 2017 (DE) ...................... 10 2017 109 221.8

(51) Int. Cl.
*B01J 20/06* (2006.01)
*C01B 13/08* (2006.01)
(Continued)

(52) U.S. Cl.
CPC ............. *B01J 20/06* (2013.01); *C01B 13/086* (2013.01); *C04B 35/04* (2013.01); *C04B 35/45* (2013.01);
(Continued)

(58) Field of Classification Search
CPC .... B01J 20/06; B01J 20/0222; B01J 20/0229; B01J 20/0237; C01B 13/086; C01B 13/08;
(Continued)

(56) References Cited

U.S. PATENT DOCUMENTS 6,361,584 B1  3/2002  Stevens et al. ................... 95/96
8,211,212 B2  7/2012  Lambert ......................... 95/138
(Continued)

FOREIGN PATENT DOCUMENTS

DE  102012025205 A1 *  7/2013  ............. C01B 13/02
DE  102012025205 A1    7/2013  ............. C04B 35/45
(Continued)

OTHER PUBLICATIONS

DE102012025205A1 machine translation (Year: 2013).*
(Continued)

*Primary Examiner* — Karl E Group
*Assistant Examiner* — Cameron K Miller
(74) *Attorney, Agent, or Firm* — Bodner & O'Rourke, LLP; Gerald T. Bodner; Christian P. Bodner

(57) ABSTRACT

The invention relates to a material for storing and releasing oxygen, consisting of a reactive ceramic made of copper, manganese and iron oxides, wherein, subject to the oxygen partial pressure of a surrounding atmosphere and/or an ambient temperature, the reactive ceramic has a transition region that can be passed through any number of times, said transition region being between a discharge threshold state of a three-phase crednerite/cuprite/hausmannite mixed ceramic and a charge threshold state of a two-phase spinel/tenorite mixed ceramic. A passing through of the transition region from the discharge threshold state towards the charging threshold state is associated with oxygen uptake and a passing through of the transition region from the charge threshold state towards the discharge threshold state is associated with oxygen release.

12 Claims, 2 Drawing Sheets

Figure 1:
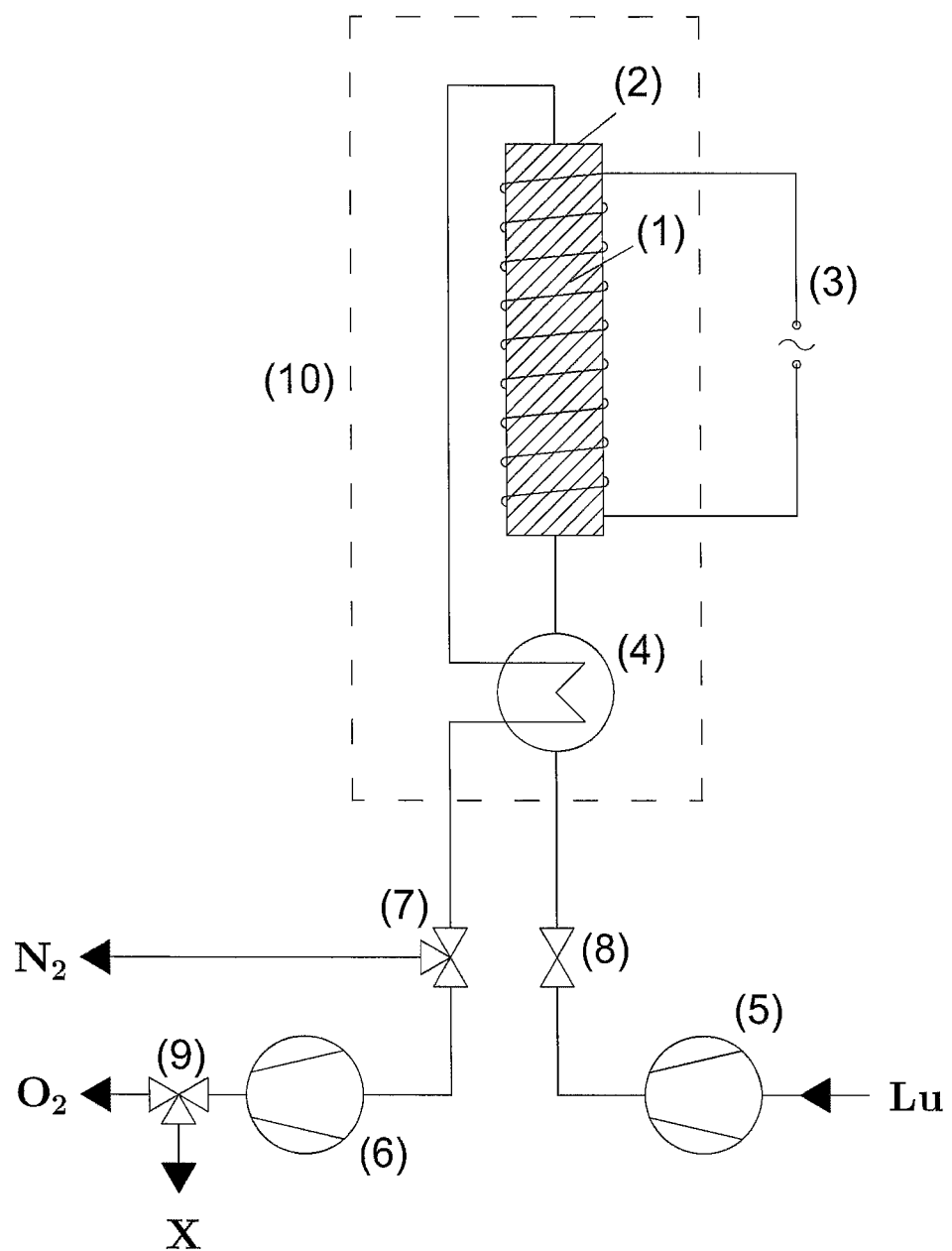

(51) Int. Cl.
*F17C 11/00* (2006.01)
*C04B 35/45* (2006.01)
*C04B 35/04* (2006.01)
*F23C 13/08* (2006.01)

(52) U.S. Cl.
CPC .............. *F17C 11/00* (2013.01); *F23C 13/08* (2013.01); *C04B 2235/3217* (2013.01); *C04B 2235/3265* (2013.01); *C04B 2235/3272* (2013.01); *C04B 2235/3281* (2013.01); *C04B 2235/763* (2013.01)

(58) Field of Classification Search
CPC . C04B 35/04; C04B 35/45; C04B 2235/3217; C04B 2235/3265; C04B 2235/3272; C04B 2235/3281; C04B 2235/763; C04B 2235/3262; C04B 2235/327; C04B 2235/768; C04B 2235/79; F17C 11/00
See application file for complete search history.

(56) References Cited

U.S. PATENT DOCUMENTS

| | | | |
|---|---|---|---|
| 2010/0278719 A1 | 11/2010 | Lambert | 423/579 |
| 2015/0290627 A1 | 10/2015 | Nazarpoor et al. | 502/324 |
| 2016/0361711 A1 | 12/2016 | Nazarpoor et al. | |

FOREIGN PATENT DOCUMENTS

| | | | | |
|---|---|---|---|---|
| EP | 2246305 A1 | 11/2010 | ............ | C01B 13/02 |
| EP | 2853306 A1 | 4/2015 | ............ | B01D 53/04 |

OTHER PUBLICATIONS

Töpfer, et al. "*Preparation and physical properties of the solid solutions $Cu_{1+x}Mn_{1-x}O_2$ ($0 \leq x \leq 0.2$)*", Journal of Solid State Chemistry, vol. 178, Issue 9, pp. 2751-2758, Jul. 21, 2005. Text available at: https://www.sciencedirect.com/science/article/pii/S0022459605002720. (last accessed Jan. 17, 2020) (copy not enclosed).

Office Action (in German), dated Dec. 8, 2017, issued by the German Patent Office for Applicant's corresponding German Patent Application No. DE102017109221.8, filed Apr. 28, 2017.

Notification Concerning Transmittal of International Preliminary Report on Patentability (Chapter I of the Patent Cooperation Treaty), in English, dated Nov. 7, 2019, which was issued by the International Bureau of WIPO in Applicant's corresponding international PCT application having Serial No. PCT/EP2018/060958, filed on Apr. 27, 2018.

English translation of the International Preliminary Report on Patentability (Chapter I of the Patent Cooperation Treaty), dated Oct. 29, 2019, which was issued by the International Bureau of WIPO in Applicant's corresponding international PCT application having Serial No. PCT/EP2018/060958, filed on Apr. 27, 2018.

Written Opinion of the International Searching Authority, in English, dated Jul. 5, 2018, which was issued by the International Bureau of WIPO in Applicant's corresponding international PCT application having Serial No. PCT/EP2018/060958, filed on Apr. 27, 2018.

International Search Report, in English, dated Jul. 5, 2018, which was issued by the International Bureau of WIPO in Applicant's corresponding international PCT application having Serial No. PCT/EP2018/060958, filed on Apr. 27, 2018.

\* cited by examiner

MATERIAL FOR STORING AND RELEASING OXYGEN

The invention relates to a material for storing and releasing oxygen having the features of claim 1.

Oxide ceramic substance systems for oxygen generation or air separation are known. Thus, ceramics with a perovskite crystal structure, for example, have the property of allowing oxygen to be incorporated reversibly into their crystal lattice or to diffuse through their volume.

There are two approaches adopted to utilize perovskite ceramics for air separation. On the one hand, ceramic membranes are manufactured from those compounds, which due to their chemical properties at temperatures of about 800° C., allow oxygen to be diffused through their crystal lattice from a gas space which is rich in oxygen to a gas space which is low in oxygen. The gas space which is low in oxygen is in this case referred to as a sweep side, the gas space which is rich in oxygen is referred to as a feed side. In return, an electrical charge balancing takes place through the ceramics in the opposite direction. Due to the high number of possible ion combinations, a plurality of such ceramics with mixed conduction (MIEC—mixed ionic-electronic conductor) exists.

At an oxygen partial pressure difference held constant between both sides, the oxygen diffusion may be utilized for continuously producing ultra-pure oxygen. This is technically applied in the form of ion transport membrane systems available on the market. However, these methods are not suitable for nitrogen or inert gas production since the driving force, the oxygen partial pressure difference between the feed and sweep side, tends toward zero with a decreasing oxygen content of the feed current.

The second approach to technically utilize perovskite ceramic systems for oxygen separation is the use thereof as oxygen storage materials (OSM—Oxygen Storage Material). The perovskite ceramics, apart from their oxygen conducting property, further have the property to incorporate and remove oxygen in and from the entire volume more or less evenly distributed. As a result, there are two threshold states for this ceramic referred to by the terms "discharging" and "charging".

For the technical utilization, the perovskite ceramic is introduced into a reactor, for example, in the form of a packed bed fill and is alternately flushed by heated air or exposed to vacuum. When the ceramic is discharged, it will take up oxygen from the circulating air. It is thus gradually charged with oxygen. When the ceramic is finally charged, the air flow will be stopped and the reactor evacuated. The ceramic will then emit its oxygen taken up before. This discontinuous process may be repeated permanently. If at least two of these reactors are operated in parallel and in opposite directions, a continuous process for air separation may be generated. This process is in part also referred to as high temperature pressure swing adsorption and is thus a high temperature variant of the PSA method. An example of this is disclosed in the document U.S. Pat. No. 6,361,584 B1. The denotation "adsorption", however is not quite correct in this context, since in reality it is rather an "absorption", in which the oxygen will not remain at the top surface of the ceramic but is taken up into the ceramic.

A further example for the use of a ceramic oxygen carrier is the so-called CLC technology (Chemical Looping Combustion). In this case, fuel is brought into contact with the ceramic oxygen carrier in the form of oxide ceramic particles in a fluidized-bed reactor. In this process, the oxygen carrier emits a part of its oxygen to the fuel. The oxygen oxidizes the fuel and thus enables a combustion in the absence of air. The oxide ceramic particles discharged in this way are subsequently conveyed into a second fluidized-bed reactor, where they are flushed with air and charged again with oxygen. When this is completed, they are again supplied to the combustion reactor and thus enable again combustion.

In the CLC method, minute particles of the oxygen storage materials thus swirl in the gas phase and must be constantly transported to and from one reactor to the other. Actually, this still represents one of the biggest problems of the CLC technology, since the particles often agglomerate at the prevailing temperatures, are thereby no longer sufficiently swirled and partially even clog the technical system equipment.

From the state of the art, further ceramics of this kind are also known:

The publication "Preparation and physical properties of the solid solutions $Cu_{1+x}Mn_{1-x}O_2 (0 \leq x \leq 0.2)$" (M. Trari, J. Toepfer at al., Journal of Solid State Chemistry 178 (2005), 2751-2758, examines the thermal stability of crednerite in air. Thereby, a reaction while taking up oxygen, toward spinel and tenorit is observed. With an increasing temperature, a reaction of spinel and tenorit back to crednerite while emitting oxygen is observed.

The document DE 10 2012 025 205 A1 discloses a ceramic oxygen storage material including spinel and/or delafossite phases and is able to reactively take up and emit again oxygen. The publication teaches the use of the oxygen storage material for oxygen generation at very long process times of 1 to 2 hours.

The document EP 2 853 306 A1 discloses a system for utilizing oxygen storage materials in so-called high temperature PSA systems. The teaching mentioned there is aimed at the use of perovskite ceramics as oxygen storage materials.

The document U.S. Pat. No. 6,361,584 B1 discloses a method and system for utilizing various oxide ceramic materials for oxygen separation from a feed gas flow in a high temperature PSA system. The teaching disclosed therein deals with a wide range of various ceramic materials. All of these structures have in common that they are ceramics which are of the non-reactive type. In particular, the are not subject to any phase transformation and are consequently only able to take up and emit again oxygen within the scope of their phase widths.

The document US 2010 278719 A1 discloses a method in which a copper-free material consisting of iron manganese oxides is utilized for high temperature oxygen production.

The documents US 2015 290627 A1 and US 2016 361711 A1 disclose copper manganese spinels as oxygen storage materials and the use thereof for exhaust gas post-treatment in motor vehicles.

The materials, which are known according to the present state of the art and are used for oxygen storage or production, as a whole have a number of disadvantages. These are in particular associated with the fact that the known materials either have only a limited oxygen storage capacity, the oxygen storage and emission are each associated with long process times for charging and discharging, and the energetic efficiency of the known materials is too low for economic usage. The known materials are only usable under very limited process conditions, whereby a preferably multipurpose and flexible usability is unfortunately excluded. Moreover, the known materials are relatively susceptible to wear and not sufficiently corrosion-resistant causing their efficiency to decrease after a determined number of process cycles and a certain period of use.

Thus, this results in the task of proposing a material for oxygen storage and separation, respectively, its use and a system therefore, which allow the mentioned disadvantages to be eliminated. It is in particular intended to secure preferably short process times in association with a long period of use and a field of application as wide as possible.

The task is solved by a material for storing and releasing oxygen having the features of claim 1. The dependent claims include appropriate and/or advantageous embodiments and configurations of the material as well as uses and applications of the material.

According to the invention, the material for storing and releasing oxygen consists of a reactive ceramic made of copper, manganese and iron oxides. In this case, subject to the oxygen partial pressure of a surrounding atmosphere and/or an ambient temperature, the reactive ceramic has a transition region that can be passed through any number of times, said transition region being between a discharge threshold state of a three-phase crednerite/cuprite/hausmannite mixed ceramic and a charge threshold state of a two-phase spinel/tenorite mixed ceramic. A passing through the transition region from the discharge threshold state towards the charge threshold state is associated with oxygen uptake and a passing through the transition region from the charge threshold state towards the discharge threshold state is associated with oxygen release.

The material according to the invention thus consists of various copper, manganese and iron oxides, which, depending on the oxygen content of the material, form different compounds with one another. In this case, single oxides may be present next to one another, but mixed oxides or combinations of both may be present at the same time. Hereby, the structures crednerite and delafossite, spinel, tenorite, hausmannite and cuprite may appear. The mutual relationship of the single phases is based on the charge state of the ceramic material, whereby the mentioned charge and discharge threshold states occur. There is a transition region between these two threshold states, in which transition region all intermediate states exist depending on the charge state of the material. The ceramic is therefore a reactive ceramic because the processes of oxygen charging and oxygen discharging are associated with a structural modification within the ceramic.

Hence, there is a smooth transition during the oxygen uptake from the discharged to the charged threshold state, and vice versa during the oxygen emission. This transition is characterized respectively by oxidation and reduction reactions of the ceramic components. In the discharge threshold state, the material substantially consists of the phases of crednerite, hausmannite and cuprite and in the charge threshold state, it substantially consists of the phases of spinel and tenorite. The transition region thus is limited in its threshold states by a three-phase mixed system, on the one hand, and a two-phase mixed system, on the other.

In an appropriate embodiment, the reactive ceramic has a chemical composition in which the substance proportion between the portion of copper and the combined portion of manganese and iron is between 0.7/0.3 and 0.4/0.6, and the substance proportion between manganese and iron is between 0.2/0.8 and 0.99/0.01.

As compared to known oxygen storage materials, the reactive ceramic of this configuration has a high oxygen storage capacity of 4.0 to 6.5% by mass.

In one embodiment of the reactive ceramic, the passing through the transition region between the discharge threshold state and the charge threshold state is feasible in both directions in a temperature range of 400° C. to 1200° C.

In a particularly advantageous embodiment, the reactive ceramic has self-porosification due to the oxygen emission during passing through the transition region towards the discharge threshold state, wherein a porosity occurs in the reactive ceramic in the range of 25% by volume to 50% by volume.

This self-porosification prevents the reactive ceramic from compressing and agglomerating and, in association with the charging and discharging of oxygen, ensures at the same time a structure which is extraordinarily expedient for the gas exchange with the surrounding atmosphere. Here, it is important that the functionality of the reactive ceramic is maintained especially through the ongoing operation and virtually is self-regenerating.

In a further configuration, the reactive ceramic has an additive of up to 25 mole-% of aluminum, nickel, cobalt, chromium and/or lithium. These additives allow the corrosion resistance of the reactive ceramic to various gases to be influenced in an advantageous manner, and the temperature stability and reaction characteristics to be adapted to the given requirements.

Furthermore, the reactive ceramic is corrosion-resistant to carbon oxide containing gases and/or sulfur oxide containing gases. It can therefore be used in contaminated or corrosive environments.

The reactive ceramic can be used in a number of different ways. In one embodiment, the reactive ceramic is introduced into a reaction vessel as a loose filling of fragments, pellets or granulated grains on a material carrier or is applied onto a material carrier as a material layer.

In case of the reactive ceramic, the passing through the transition region from the charge threshold state toward the discharge threshold state is also inducible by applying a vacuum or by acting upon with water vapor and/or other gases that are low in oxygen or free from oxygen.

The reactive ceramic may be used for different purposes.

A first possible use is performed in a device for producing inert gas from an oxygen containing gas mixture, in particular from air, wherein the reactive ceramic is used to extract the oxygen portion present in the gas mixture.

A further possible use is performed in a device for obtaining oxygen from an oxygen containing gas mixture, in particular from air, wherein the reactive ceramic is utilized to extract and intermediately store the oxygen and to subsequently emit the oxygen into a separate gas volume.

Furthermore, the use of the reactive ceramic in a device for oxygen enrichment and oxygen depletion in gas mixtures, in particular in air, is possible.

A use of the reactive ceramic in a device for catalytic flameless combustion of gaseous fuels is also possible.

A system for using the reactive ceramic for storing and releasing oxygen includes a reactor having a reaction chamber filled with the reactive ceramic, a heating system for heating the reaction chamber, a valve means for controlling a gas flow flowing into and out of the reaction chamber and/or for separating usable and exhaust gas, as well as pumps for generating a positive and/or negative pressure within the reaction chamber. In one embodiment of the system, at least two reactors are provided that are connected in parallel and operated in opposite directions in their working cycle, wherein a continuous oxygen separation may be performed due to the reactions operated in opposite directions.

Hereinafter, the material for storing and releasing oxygen will be described in more detail on the basis of exemplary embodiments and uses.

Figure 2:
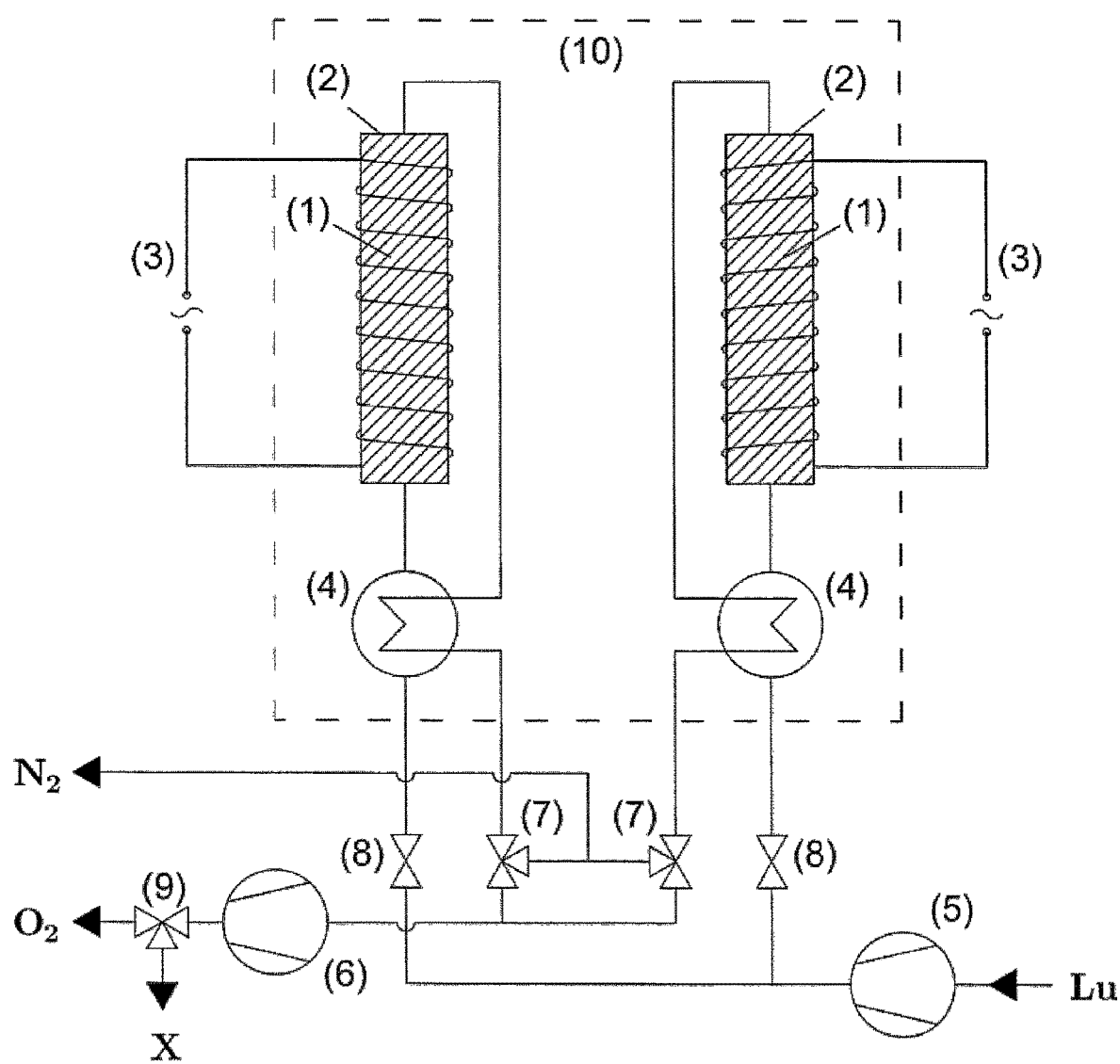

FIGS. 1 and 2 serve as explanation. Shown is in:

FIG. 1 an exemplary system having a reactor including the reactive ceramic,

FIG. 2 an exemplary circuit of two reactors functioning in alternating operation.

The material for storing and releasing oxygen is a ceramic oxygen storage material based on copper, manganese and iron oxides. The oxygen storage material is a reactive mixed ceramic with a varying phase content, which, when the phase content changes, makes a transition, wherein it can uptake and emit oxygen, respectively. The current phase content of the reactive mixed ceramic thus depends on the oxygen content, i.e. the charge state of the oxygen storage material. In this, two threshold states may be defined for the reactive mixed ceramic, which include a transition region in which the charging and discharging with oxygen is feasible. These threshold states are the discharge threshold state, on the one hand, and the charge threshold state, on the other. In the discharge threshold state, the reactive ceramic is maximally discharged and has emitted all of the oxygen to be potentially emitted, and in the charge threshold state, the reactive ceramic is maximally charged and can no longer take up any further oxygen.

Both the discharge threshold state and the charge threshold state are clearly detectable in the reactive ceramic by the presence of in each case different phases, and may also be defined via these phases. The discharge threshold state in the material present here is defined by the phases of crednerite, hausmannite and cuprite with a possible portion of delafossite, wherein the charge threshold state is defined by the phases of spinel and tenorite. The transition between the two threshold states is smooth and determined by the oxygen partial pressure of the surrounding atmosphere and the temperature of the oxygen storage material. It is accompanied by an oxygen uptake from and an oxygen emission to the surrounding atmosphere, respectively.

The oxygen storage material is of versatile use, for example for separating oxygen from oxygen containing gas mixtures. The use of this oxygen storage material thus enables air to be separated into oxygen and inert gas that is free from oxygen (i.e. nitrogen, together with the portion of noble and trace gases), and to make available both the oxygen and the inert gas portion separately. It is moreover possible for air or other gas mixtures to be enriched or depleted with or from oxygen.

The use of the ceramic oxygen storage material is enabled by a system consisting of at least the ceramic oxygen storage material, a reactor, a heating, a heat transfer device, a gas pump, a vacuum pump, valves and a control unit. This system functions in various embodiments as an oxygen generator, nitrogen generator, air separator or oxygen dosing device.

The material consists of copper, manganese and iron oxides forming different compounds with each other depending on the oxygen content bound in the material.

Thus, single oxides may be present next to one another, but also mixed oxides or combinations of both may be present at the same time. Here, the structures of crednerite ($CuMn_{1-x}Fe_xO_2$ with $0 \leq x \leq 0.75$) and delafossite ($CuFe_{1-x}Mn_xO_2$ with $0 \leq x < 0.25$), collectively referred to as $Cu(Mn, Fe)O_2$, spinel $Cu(Mn,Fe)_2O_4$ ($CuMn_{2(1-x)}Fe_{2x}O_4$ with $0 \leq x \leq 1$), tenorite (CuO), hausmannite ($Mn_3O_4$) and cuprite ($Cu_2O$) may appear. The relationship of the single phases to one another is based on the charge state of the ceramic material.

The phases of copper-manganese-crednerite ($CuMnO_2$) and copper-iron-delafossite ($CuFeO_2$) may be present individually next to one another or as mixed phases of $Cu(Mn, Fe)O_2$. If a growing portion of manganese is added to the delafossite, the delafossite will gradually transform into a crystallographically distorted crednerite. If pure copper-manganese-crednerite is taken as the starting basis and iron is added step by step, the copper-manganese-crednerite will gradually transform into delafossite. As a result, there is a continuous series of mixtures between crednerite and copper-iron-delafossite.

According to the invention, crednerite is now taken as a basis, wherein in the use of crednerite, a higher oxygen storage capacity of the reactive ceramic is achieved as compared to delafossite.

As the oxygen storage material, the reactive ceramic may adopt two threshold states: the discharge threshold state, on the one hand, and the charge threshold state, on the other. Depending on the charging state of the material, all intermediate states exist between these two threshold states, consequently there is a smooth transition region from the discharged threshold state to the charged threshold state both during the oxygen uptake and vice versa during the oxygen emission. This transition is respectively characterized by oxidation and reduction reactions of the ceramic components. Thus, the material is a reactive ceramic, into which the oxygen is absorbed via chemical bonds, respectively is released while disconnecting the chemical bonds.

In the discharge threshold state, the material consists of the phases of crednerite, hausmannite and cuprite with a certain but not necessarily present portion of delafossite, while the phases of spinel and tenorite are detectable in the charge threshold state. The reactive ceramic thus preforms a transition between a three-phase state and a two-phase state in the course of the oxygen intake and emission, respectively.

In detail, the following reactions between the discharge threshold state and the charge threshold state take place in the reactive ceramic while oxygen is taken up and emitted:

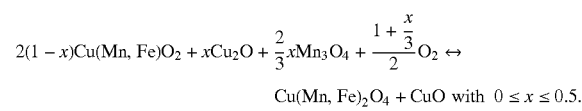

$$2(1-x)Cu(Mn, Fe)O_2 + xCu_2O + \frac{2}{3}xMn_3O_4 + \frac{1+\frac{x}{3}}{2}O_2 \leftrightarrow$$

$$Cu(Mn, Fe)_2O_4 + CuO \text{ with } 0 \leq x \leq 0.5.$$

The reaction equation describes in this case from the left to the right the charging and thus the passing through the transition region toward the charge threshold state, and from right to left the discharging and thus the passing through the transition region toward the discharge threshold state.

Depending on the case of application and requirements to be met by the material, the molar relationship between manganese and iron in the ceramic (Mn, Fe) is settable by the molar relationship of the starting materials in producing the oxygen storage material according to the invention having an iron content of $0 \leq Fe/(Fe+Mn) \leq 1$ (molar).

The composition, accordingly the phase relationship of the discharged reactive ceramic and thus the value of the variable x, depends on the conditions of the discharge process (temperature, oxygen partial pressure and time) and the molar relationship of the elements iron and manganese, i.e. Fe/(Fe+Mn).

The configuration of the reactive ceramic provides for the oxygen storage material to include an excess of copper in the following relationship: Cu/(Cu+Fe+Mn)>0.5 (molar). This leads to an increase of the oxygen storage capacity of the material, since copper is significantly involved in the proceeding redox reactions for taking up and emitting oxygen.

A further configuration of the reactive ceramic provides for the reactive ceramic to have portions of aluminum, nickel, cobalt, chromium, lithium or combinations of these added. Hereby, the temperature stability, reaction speed, oxygen storage capacity, reactivity, porosity, stability and/or strength may be adapted to the respective requirement of an application.

The reactive ceramic oxygen storage material described herein has an oxygen storage capacity in the range of 4.0 to 6.5% by mass in terms of the mass of the discharged ceramic. The charging preferably takes place in the range of 400 to 900° C. while oxygen is taken up from the surrounding atmosphere, and the discharging takes place in the temperature range of 650 to 1150° C. while oxygen is emitted to the surrounding atmosphere. In this case, reaction speeds of up to 20 $l_{O2}$/(min*$kg_{ceramic}$) at reaction temperatures of 400 to 1150° C. are achieved.

The reaction times for charging and discharging the reactive ceramic are in the range of a few seconds to minutes and are very short as compared to the reaction times with the materials known from the state of the art. The reaction times may be significantly influenced by the correcting variables of temperature and oxygen partial pressure of the surrounding atmosphere.

The reaction direction and the reaction progress are influenced by the combination of the correcting variables of the oxygen partial pressure of the surrounding atmosphere and the temperature of the material. At low temperatures and higher oxygen partial pressures, the oxygen charging will be promoted, and at higher temperatures and lower oxygen partial pressures, the oxygen discharging will be promoted.

It has been found to be very advantageous for the use of the oxygen storage material described herein, especially with respect to a use for oxygen separation, to decrease the oxygen partial pressure by generating a negative pressure or applying a vacuum to the surrounding atmosphere, to thereby discharge the material and separate the oxygen from the material. Furthermore, the oxygen partial pressure may be decreased by flushing with gases that are low in or free from oxygen (e.g. Ar, $CO_2$, $H_2O$).

The charging may be promoted by generating a positive pressure in the oxygen containing atmosphere around the oxygen storage material.

Surprisingly, the oxygen storage material according to the invention has been proven to undergo a process of self-porosification which is directly caused by the oxygen introduction and removal and the reactive conversion of the ceramic. It shows that a balanced porosity of 25 to 50% by volume may be set over the period of use of the material. This porosity ensures consistent oxygen storage properties and is regenerated by the use of the reactive ceramic itself.

The corrosion resistance of the ceramic oxygen storage material has proven to be a very advantageous property. In contact with carbon dioxide and sulfur oxides, no corrosion products are found. This enables the reactive ceramic to be used in an extraordinarily versatile manner. Thereby, it can be used in particular for oxygen enrichment or depletion in exhaust or process gases.

A further advantage of the reactive ceramic oxygen storage material according to the invention is its simple preparation ability as compared to other ceramic oxygen storage materials. The reactive ceramic is preponderantly manufactured from copper, manganese and iron oxides, that are harmless for health, by powder or solid preparation. The embodiment of the oxygen storage material according to the invention provided for technical use is possible in the form of fragments, granulated bodies or pellets which can be filled into a corresponding reaction chamber as a loose filling. But it is also possible for the reactive ceramic to be applied onto a material carrier as a coating. In such a case, a grid-shaped or lamellar material carrier is preferable in order to guarantee a coated surface as large as possible.

For using the reactive ceramic oxygen storage material according to the invention, it is correspondingly placed into a reaction chamber of a reactor. The reaction chamber is heated to the respective reaction temperature and applied with the atmosphere correspondingly promoting the reaction, which atmosphere promotes a passing through the transition region in one of the two directions, i.e. toward one of the two threshold states.

The use of the reactive ceramic oxygen storage material for oxygen separation enables oxygen, technical nitrogen and oxygen-free inert gas, respectively, to be generated with this material. In addition, oxygen containing gas mixtures may be enriched with or depleted from oxygen, and oxygen-free gas mixtures may likewise be enriched with oxygen. Particularly, for use in a so-called oxyfuel process and for the oxygen enrichment of combustion air, this use is of high importance. The latter is employed, for instance, in the combustion optimization at general and for burning low-calorific lean gases as well as landfill or raw biogas.

The ceramic oxygen storage material according to the invention is moreover suitable for a catalytic flameless combustion of gaseous fuels.

Hereinafter, a system will be proposed for the use of the ceramic oxygen storage material which enables the oxygen storing properties of the reactive ceramic to be technically utilized. The very good oxygen storing properties of the reactive ceramic described herein allow the system described below to be operated under highly different aspects: namely for oxygen extraction, gas separation and inert gas production. All of the aspects are in this case performed with the same effectiveness, which constitutes the multi-purpose usability of the system and, above all, of the reactive ceramic described herein.

Here, FIGS. 1 and 2 show exemplary embodiments of such systems. FIG. 1 shows a system with one reactor and thus one reaction chamber, FIG. 2 shows an interconnection of two reactors and reaction chambers.

A reaction chamber which can be composed of one or more reactors 2 forms the respective functional core component of the systems shown in FIGS. 1 and 2. The reactor 2 respectively contains the ceramic oxygen storage material 1 described above. For charging, the oxygen storage material is flushed with oxygen containing gases in the reaction chamber, and for discharging, it is surrounded by a negative pressure or a vacuum or is flushed with a gas that is free from or low in oxygen. In order to achieve the necessary temperature level for the reactions in the reaction chamber, each reactor is surrounded by a heating system 3. The heating system may be operated electrically by means of a combustion system or with any other heat sources.

The heating system 3 may be arranged around the reactor or guided through the reactor in different ways so that an equal distribution of the heating power is given and the reaction chamber is optimally heated by the oxygen storage material.

In the reaction chamber, the reactive ceramic oxygen storage material 1 is placed either in loose form as a filling in the form of pellets, fragments or granulated bodies without or with auxiliary devices or as a material layer on a material carrier. These auxiliary devices may be intermediate floors, sieves or filling bodies. The objective is to hereby achieve an optimum flowing through capability of the material and to combine this with a modular construction of the reactor, where appropriate.

Since the entire process of using the ceramic oxygen storage material for oxygen separation is a high temperature process, a system for heat recovery/transfer is provided on the reaction chamber. In the example present here, this system is formed as a heat transfer device 4. The task of this heat transfer device is to transfer the heat conducted along with the gases flowing out from the reaction chamber back to the inflowing gases. For this purpose, recuperatively or regeneratively working systems as well as combinations of both systems are suitable.

The reactor 2 containing the oxygen storage material 1, the heating system 3 and the heat transfer device 4 may be combined into one reactor module. Such a reactor module forms a functional and constructional unit within the system according to the invention for using the reactive ceramic oxygen storage material for oxygen separation.

The reactor module as a whole is enclosed by a thermal insulation 10 which minimizes heat losses and thus enables the system according to the invention to be operated in an energy-efficient manner.

To introduce the required gases into the reaction chamber and to generate the correct pressure therein, a gas pump 5 is provided which is able to generate a continuous gas flow, with the pressure of the gas flow being preferably close to the ambient pressure. This inflowing gas flow is controlled through a first valve 8. A second valve 7 connected downstream of the reactor module in the flow direction controls the outflowing gas flow.

To generate the negative pressure or the vacuum in the reaction chamber and to expel the product gas from the reaction chamber, a vacuum pump 6 is provided.

A third valve 9 is connected downstream of the vacuum pump and enables the separation of useful gas $O_2$ and exhaust gas X. Hereby, the negative effects of a switching delay or the inertia of the system in a shift from charging to discharging are eliminated and high purity of the gases is enabled.

The entire system is automatically switched by an electronic control and regulating unit but can also be influenced manually, if necessary.

The plant according to the invention is characterized by a great variety of possible applications. It can be used as an oxygen separation system for the production of oxygen with a settable purity of more than 99% by volume, and for the production of inert gas (i.e. nitrogen and the oxygen-free residual gas portions such as argon) with a settable residual oxygen content of less than 1% by volume, as well as for a combination of both of them. By means of a further development of the system according to the invention, it is furthermore possible to generate a gas flow with a settable oxygen content of 0 to 100% by volume.

A configuration of the system according to the invention in the form of a parallel connection of several reactors or reactor modules according to FIG. 2 is advantageous. Hereby, it is achieved that a continuous production of all of the gases is simultaneously enabled. Since one cycle of oxygen separation is comprised of two partial cycles, namely the charging and discharging of oxygen storage material, a continuous process of oxygen separation may be generated by an opposite and alternating operation of more of these partial cycles.

It has proven to be very advantageous that, using the reactive oxygen storage material in the system shown herein, comparably large amounts of product gases with high degrees of purity may be achieved at a very low constructional size and low system costs as compared to the state of the art of known systems. Furthermore, due to its high efficiency, the system has a very low specific energy demand and thus low operational costs for the production of the gases. The latter results inter alia from the fact that a high-performance and energy-intense compressed air technology is not required for the operation of the system according to the invention, since the charging is performed preferably close to the ambient pressure. The built-in pump technology may therefore be realized preferably by small energy-saving membrane pumps.

It is furthermore an advantage of the mentioned system that it does not cause noise emissions due to its type of construction, technology and the use of small low-noise pumps and can therefore also be used for sound insulated applications.

Possible exemplary embodiments of the reactive ceramic and the corresponding system will be indicated below.

a) Mixed Series Cu—Mn—O/Cu—Mn—Fe—O/Cu—Fe—O

It appears that the reactive ceramic oxygen storage materials on the basis of copper, manganese and iron oxides form a continuous mixed series between the copper manganese oxides and the copper iron oxides. This mixed series may be prepared from the individual oxides of CuO, $Mn_2O_3$ and $Fe_2O_3$ and be examined as to their energy storing or separating properties. Surprisingly, the entire mixed series turned out to be in principle suitable as an oxygen storage material. However, different phase contents, reaction conditions and reaction characteristics are associated therewith. This means that, depending on the application criteria, the material may be adapted to the requirements in a targeted manner.

b) Increasing the Application Temperature by Adding Aluminum Oxide

If gamma aluminum oxide is added to the ceramic oxygen storage material according to the invention, its temperature of use can be raised. An addition of 10% by mass of aluminum results in an increase of the application temperature of up to 200 K.

c) Excess of Copper in the Oxygen Storage Material

If, apart from the tenorite already present, an identical amount of tenorite is added in addition to the charged oxygen storage material, a mass loss of about 6.5% by mass results in the discharge at a temperature of 1000° C. The oxygen storage capacity of the ceramic material may thus be further enhanced.

d) System for Air Separation

The system shows the functionality of the material, the method and the system. A continuous oxygen flow with a purity of >98% by volume and a nitrogen flow with a residual oxygen content<2% by volume could be produced from the air using different compositions of the oxygen storage materials.

Further embodiments will result from the dependent claims as well as in the scope of skilled action.

LIST OF REFERENCE NUMERALS

1 oxygen storage material
2 reactor 3 heating system
4 heat transfer device
5 gas pump
6 vacuum pump
7 valve for the outflowing gas flow
8 valve for the inflowing gas flow
9 valve for separating useful and exhaust gas
10 thermal insulation

The invention claimed is:

1. A material for storing and releasing oxygen, consisting of a reactive ceramic made of copper, manganese and iron oxides, produced by powder and solid state preparation from various copper, manganese and iron oxides forming different compounds with each other depending on the oxygen content bound in the material,
- wherein single oxides may be present next to one another, but also mixed oxides or combinations of both may be present at the same time,
- wherein the reactive ceramic has a chemical composition in which the molar ratio between the portion of copper and the combined portion of manganese and iron is between 0.7/0.3 and 0.4/0.6, and the molar ratio between manganese and iron is between 0.2/0.8 and 0.99/0.01,
- wherein the structures of crednerite ($CuMn_{1-x}Fe_xO_2$ with $0 \leq x \leq 0.75$) and delafossite ($CuFe_{1-x}Mn_xO_2$ with $0 \leq x < 0.25$), spinel ($CuMn_{2(1-x)}Fe_{2x}O_4$ with $0 \leq x \leq 1$), tenorite (CuO), hausmannite ($Mn_3O_4$) and cuprite ($Cu_2O$) appear,
- wherein the relationship of the single phases to one another is based on the charge state of the ceramic material,
- wherein, subject to a oxygen partial pressure of a surrounding atmosphere of oxygen-containing gas mixtures, air, oxygen-poor or oxygen-free gases or vacuum and/or an ambient temperature, the reactive ceramic has a transition region that can be passed through any number of times, said transition region being between a discharge threshold state of a three-phase crednerite/cuprite/hausmannite mixed ceramic and a charge threshold state of a two-phase spinel/tenorite mixed ceramic,
- wherein in the discharge threshold state due to an increased portion of manganese delafossite is transformed into a crystallographically distorted crednerite wherein a higher oxygen storage capacity of the reactive ceramic is achieved,
- wherein a passing through the transition region from the discharge threshold state towards the charge threshold state is associated with oxygen uptake and a passing through the transition region from the charge threshold state towards the discharge threshold state is associated with oxygen release,
- wherein the phase content of the reactive mixed ceramic depends on the charge state of the oxygen storage material,
- wherein the reaction direction and the reaction progress are influenced by the combination of the variables of the oxygen partial pressure of the surrounding atmosphere and the temperature of the material,
- wherein the reaction times for charging and discharging the reactive ceramic are in the range of a few seconds to minutes, and
- wherein the reactive ceramic has self-porosification due to the oxygen emission during passing through the transition region towards the discharge threshold state,
- wherein a porosity in the range of 25% by volume to 50% by volume occurs in the reactive ceramic.

2. The material according to claim 1,
characterized in that
the reactive ceramic has an oxygen storage capacity of 4.0 to 6.5% by mass.

3. The material according to claim 1,
characterized in that
in the reactive ceramic, the passing through the transition region between the discharge threshold state and the charge threshold state is feasible in both directions in a temperature range of 400° C. to 1200° C.

4. The material according to claim 1,
characterized in that
the reactive ceramic has an additive of up to 25 mole-% of aluminum, nickel, cobalt, chromium and/or lithium.

5. The material according to claim 1,
characterized in that
the reactive ceramic is corrosion-resistant to carbon oxide containing gases and/or sulfur oxide containing gases.

6. The material according to claim 1,
characterized in that
the reactive ceramic can be introduced into a reaction vessel as a loose filling of fragments, pellets or granulated bodies on a material carrier or as an applied material layer on material carrier.

7. The material according to claim 1,
characterized in that
in the reactive ceramic, the passing through the transition region from the charge threshold state toward the discharge threshold state is inducible by applying a vacuum or by acting upon with water vapor and/or other gases that are low in oxygen or free from oxygen.

8. A method of using the reactive ceramic according to claim 1 in a device for producing inert gas from an oxygen containing gas mixture, wherein the reactive ceramic is used to extract an oxygen portion present in the oxygen containing gas mixture, which comprises the steps of: introducing the reactive ceramic into a reaction vessel; supplying the oxygen containing gas mixture to the surrounding atmosphere; separating the oxygen containing gas mixture into oxygen and inert gas by storing the oxygen portion of the oxygen containing gas mixture in the reactive ceramic; and expelling the inert gas from the reaction vessel.

9. A method of using the reactive ceramic according to claim 1 in a device for obtaining oxygen from an oxygen containing gas mixture, wherein the reactive ceramic is utilized to extract and intermediately store the oxygen and to subsequently emit the oxygen into a separate gas volume, which comprises the steps of: introducing the reactive ceramic into a reaction vessel; supplying the oxygen containing gas mixture to the surrounding atmosphere; storing the oxygen from the oxygen containing gas mixture in the reactive ceramic; separating the oxygen from the reactive ceramic; and expelling the separated oxygen to the separate gas volume.

10. A method of using the reactive ceramic according to claim 1 in a device for oxygen regulation in a gas mixture, wherein the reactive ceramic is utilized to extract, intermediately store and/or to emit oxygen for oxygen enrichment and/or oxygen depletion in the gas mixture which comprises the steps of: introducing the reactive ceramic into a reaction vessel; supplying the gas mixture to the surrounding atmosphere; and charging the reactive ceramic or discharging the reactive ceramic.

11. A system for using a reactive ceramic for storing and releasing oxygen according to claim 1,
including
a reactor with a reaction chamber filled with the reactive ceramic,
a heating system for heating the reaction chamber,
a valve means for controlling a gas flow flowing into and out of the reaction chamber and/or for separating usable and exhaust gas,
a gas pump for generating a gas flow into the reaction chamber, and
a vacuum pump for generating a negative pressure within the reaction chamber.

12. The system according to claim 11,
characterized in that
at least two reactors are provided that are connected in parallel and operated in opposite directions in their working cycle, wherein a continuous oxygen separation may be performed due to the reactions operated in opposite directions.

\* \* \* \* \*